(12) United States Patent

Morales et al.

(10) Patent No.: US 12,639,017 B2

(45) Date of Patent: May 26, 2026

(54) METHODS AND PRINTING SYSTEM FOR CONFIGURABLE QUEUE SUBMISSION

(71) Applicant: Kyocera Document Solutions Inc., Osaka (JP)

(72) Inventors: Javier A. Morales, Rochester, NY (US); Timothy F. Donahue, Mentor, NY (US)

(73) Assignee: Kyocera Document Solutions Inc., Osaka (JP)

( * ) Notice: Subject to any disclaimer, the term of this patent is extended or adjusted under 35 U.S.C. 154(b) by 282 days.

(21) Appl. No.: 18/588,647

(22) Filed: Feb. 27, 2024

(65) Prior Publication Data

US 2025/0272029 A1 Aug. 28, 2025

(51) Int. Cl.
*G06F 3/12* (2006.01)

(52) U.S. Cl.
CPC .......... *G06F 3/1204* (2013.01); *G06F 3/1227* (2013.01); *G06F 3/1246* (2013.01); *G06F 3/1286* (2013.01); *G06F 3/1287* (2013.01)

(58) Field of Classification Search
None
See application file for complete search history.

(56) References Cited

U.S. PATENT DOCUMENTS

| | | | | |
|---|---|---|---|---|
| 2018/0285030 A1* | 10/2018 | Yokoohji | .............. | G06F 3/1256 |
| 2019/0155553 A1* | 5/2019 | Matsui | .................. | G06F 3/1205 |
| 2021/0141575 A1* | 5/2021 | Murugan | .............. | G06F 3/1208 |

* cited by examiner

*Primary Examiner* — Lennin R Rodriguezgonzalez
*Assistant Examiner* — Lennin R Rodriguez
(74) *Attorney, Agent, or Firm* — Millen, White, Zelano & Branigan P.C.; William F. Nixon

(57) ABSTRACT

A configuration data file is imported into a printing system. The configuration data file is assigned to a configurator for a format of the data file. The configuration data file includes a plurality of types of data. The configurator parses the data file to define a plurality of variables. Each variable corresponds to a type of data in the data file and has a plurality of values. The configurator generates a table having entries for each variable. The entries for each variable are populated with the plurality of values for the corresponding type of data. A variable is selected from the table. The variable is mapped to a print ticket option. A print ticket is created for a print job having the format. The print ticket includes the print ticket option having the variable.

20 Claims, 6 Drawing Sheets

Figure 5:
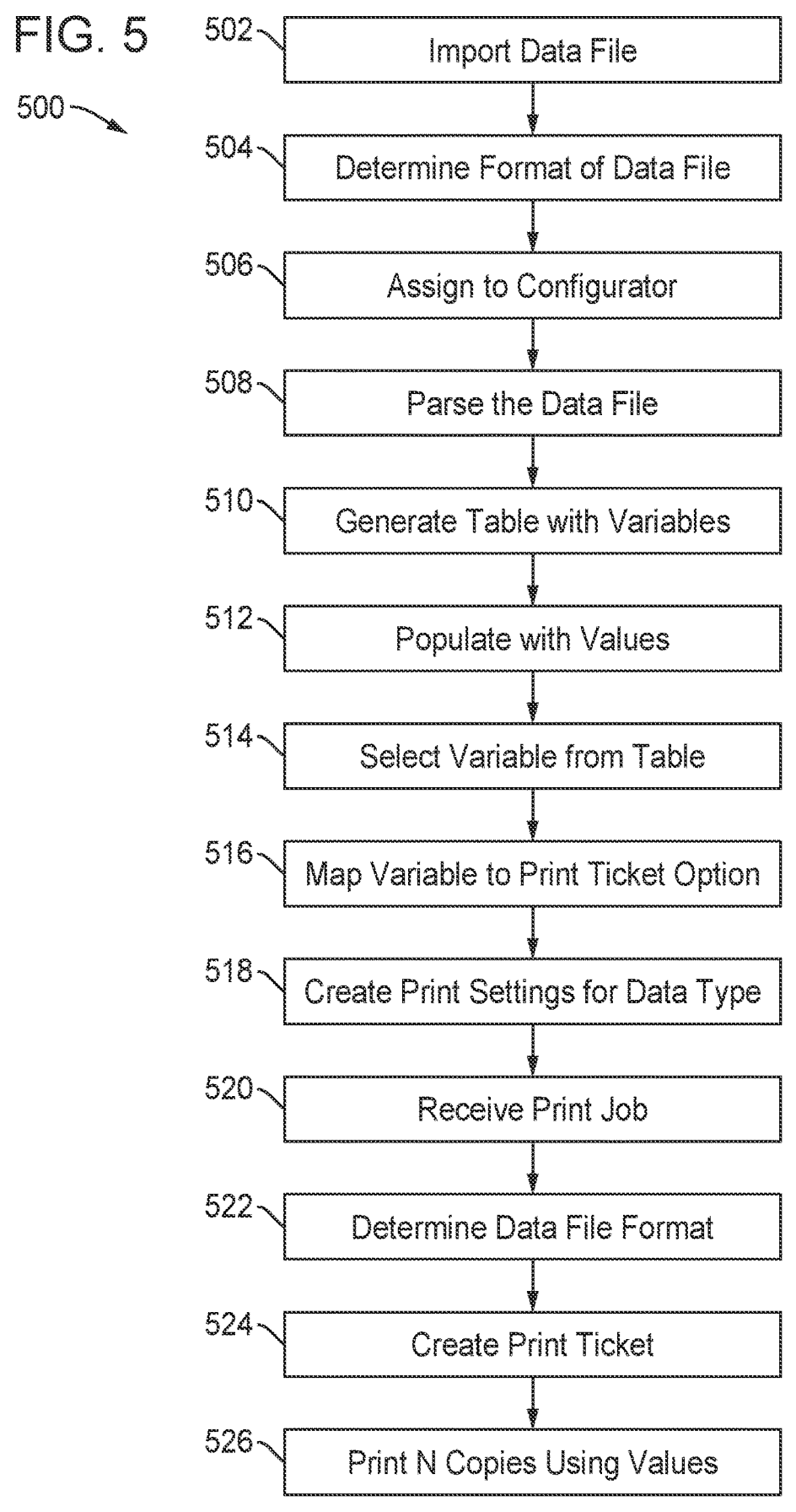

502 — Import Data File

504 — Determine Format of Data File

506 — Assign to Configurator

508 — Parse the Data File

510 — Generate Table with Variables

512 — Populate with Values

514 — Select Variable from Table

516 — Map Variable to Print Ticket Option

518 — Create Print Settings for Data Type

520 — Receive Print Job

522 — Determine Data File Format

524 — Create Print Ticket

526 — Print N Copies Using Values

METHODS AND PRINTING SYSTEM FOR CONFIGURABLE QUEUE SUBMISSION

FIELD OF THE INVENTION

The present invention relates to a printing system and associated methods for managing printing operations that enables a configurable queue submission of data files for print jobs.

DESCRIPTION OF THE RELATED ART

Submission of multiple print jobs having related material can be time consuming and work extensive. Further, large data files having different formats may need pairwise integration or custom scripts to enable integration.

SUMMARY OF THE INVENTION

A method for managing printing operations is disclosed. The method includes importing a configuration data file into a configurator. The configuration data file includes a plurality of types of data. The method also includes parsing the configuration data file to define a plurality of variables using the configurator. Each variable corresponds to a type of data from the plurality of data. The type of data has a plurality of values. The method also includes generating a table having entries for each variable. The entries for each variable are populated by one of the plurality of values for the type of data corresponding to the variable. The method also includes selecting a variable from the table. The variable is within the configuration data file. The method also includes mapping the variable to a print ticket option. The method also includes creating a print ticket for a print job. The print ticket includes the print ticket option having a value for the variable associated with a print file for the print job.

A method for managing printing operations is disclosed. The method includes generating a table having a plurality of variables derived from a configuration data file. Each of the plurality of variables includes a plurality of entries having a value of a plurality of values. The method also includes selecting a variable from the table. The variable is within the configuration data file. The method also includes mapping the variable to a print ticket option. The method also includes creating a print ticket for a print job. The print ticket includes the print ticket option having a value for the variable associated with a print file for the print job. The method also includes printing a document for the print job using the print ticket. A value is printed for the variable within the document according to the print ticket option.

A printing system is disclosed. The printing system includes a processor and a memory connected to the processor. The memory stores instructions that, when executed using the processor, configures the printing system to import a configuration data file into a configurator. The configuration data file includes a plurality of types of data. The printing system also is configured to parse the configuration data file to define a plurality of variables using the configurator. Each variable corresponds to a type of data from the plurality of types of data. The type of data has a plurality of values. The printing system also is configured to generate a table having entries for each variable. The entries for each variable are populated by one of the plurality of values for the type of data corresponding to the variable. The printing system also is configured to select a variable from the table. The variable is within the configuration data file. The printing system also is configured to map the variable to a print ticket option. The printing system also is configured to create a print ticket for a print job. The print ticket includes the print ticket option having the variable associated with a print file for the print job.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

FIG. 5 illustrates

DETAILED DESCRIPTION OF THE PREFERRED EMBODIMENTS

Figure 1A:
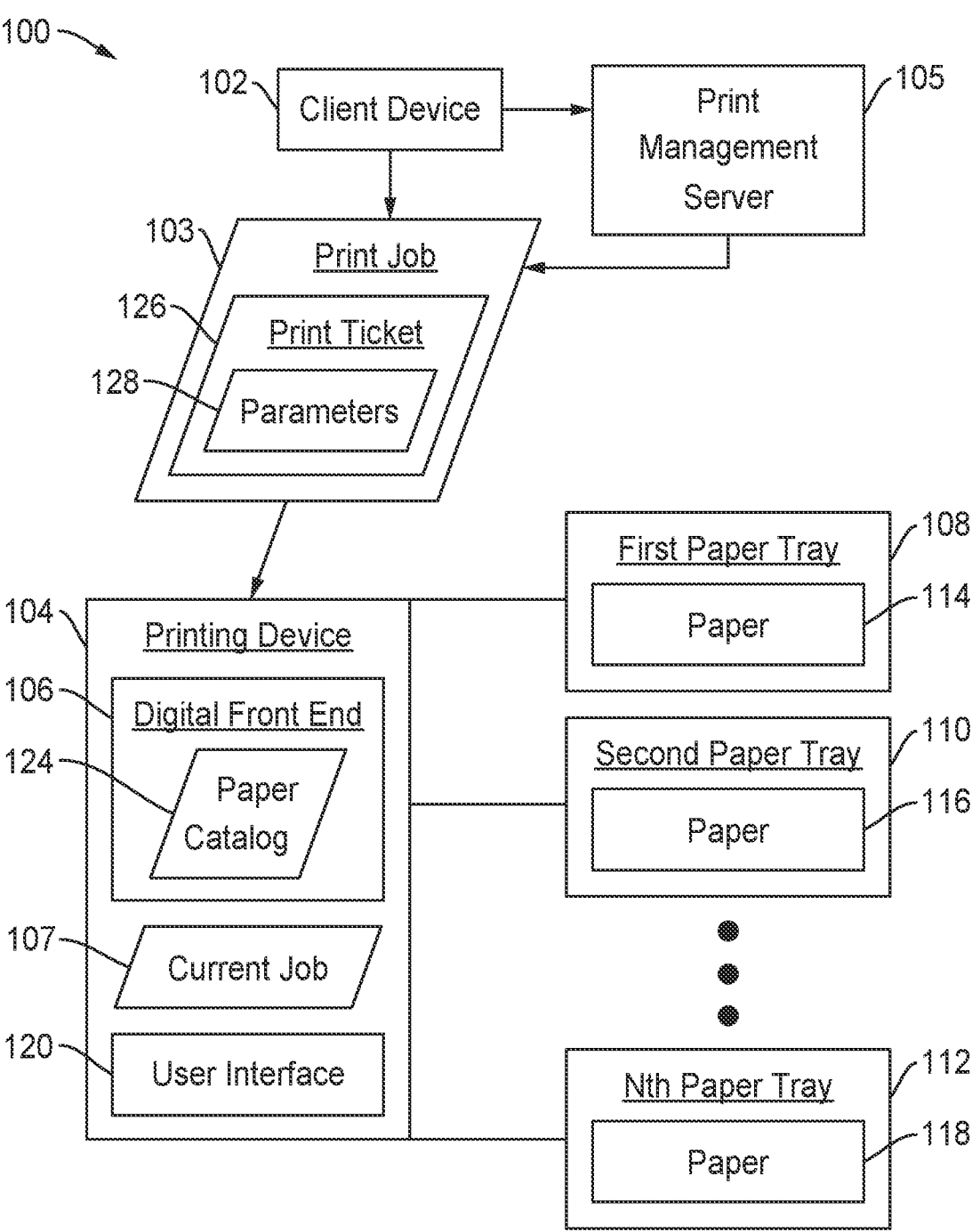
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a printing system that enables consumption of data files from upstream systems without the need to do pairwise integration and without the need to write custom scripts to enable integration between upstream systems and the digital front end (DFE). The disclosed embodiments extend DFE job submission, such as XJMF, DFE user interface, hot folders, LPR, and the like, to support any type of file. The printing system will have known file types that can be consumed natively, such as XJMF.

In addition, the operator will have the option to use format-specific configurations that control how file of a specific format are consumed and mapped into printing instructions. These configurators are associated with specific file types. For example, a printing system may have CSV, JSON, or XML configurators. The configurators provide a mechanism for an operator to configure parsing of the data file in order to define variables that may be used to define default print settings.

For example, the disclosed embodiments may include a CSV configurator that would allow the operator to define parsing options for finding variables within the CSV files. The configurator would allow the operator to specify variables for each CSV column. The disclosed embodiments may include an XML configurator that would allow the operator to specify mapping for finding variables within XML files. This configurator would allow the operator to specify variables for a specific XML element or attribute values. The disclosed embodiments may include a JSON configurator that would allow the operator to specify mapping for finding variables within JSON files.

To use the configurator, the disclosed embodiments would import sample data into the printing system. The operator may import one or more CSV, XML, or JSON files as sample data. The operator can see a preview of how the data will be parsed based on the current configuration. For each of the variables, the disclosed embodiments also will retrieve all unique values. Once the configuration is complete, the disclosed embodiments will have a list of variables, whose values are populated for each data file based on the configuration.

Once data source parsing is complete, the user interface will give the operator the ability to map these variables and their values to specific print ticket options. Print ticket options may be categorized into one of the following types. "Closed" print ticketing may refer to print ticket options that have a defined set of values, such as sides can be front, back, head to head, or head to toe. The operator will have the option to specify which variable is used to define this value. The operator may optionally define a different variable for each data format. For example, one for CSV files and a different one for JSON files. The operator may optionally specify one or more variable values that will map to each of the possible print ticket options. For example, the operator may map onesided or simplex values to "front." This mapping also may be done differently for each type of data file.

Another print ticket option is open print ticketing. "Open" print ticketing may refer to print ticket options that do not have a defined set of values, even if they have a valid range of values. For these, the operator will have the option to specify which variable is used to define the value. The variable value must be valid for the print ticket option. The operator may define a different variable for each data format. For example, one for CSV files and a different one for JSON files.

Another print ticket option may be hybrid print ticketing. "Hybrid" print ticketing may be print ticket options that do not have a defined set of values but for which the disclosed embodiments will allow the operator to define a value using a combination of static text and one or more variables. For example, the location of the file may be based on a uniform resource locator (URL) address.

After configuration is complete, the disclosed embodiments are ready to accept the job submission using the configured data types. When a file is received, regardless of the submission, the disclosed embodiments may identify the file and determine whether it is a file type that should be parsed per the data source configuration. If the file is indeed one of those files, then the disclosed embodiments will parse the data per the configuration. The disclosed embodiments also will set the variables and then use those variables to create a print ticket for the job. The job then is submitted with the created print ticket.

The disclosed embodiments allows customers to enable fairly sophisticated integration with many systems, especially a non-print system, without the need for programming expertise and without the need to spend time and effort writing one-off software.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000 s of pages or even 100,000 pages or more.

Print job 103 may include a print ticket 126 that sets forth one or more parameters 128 for the print job. For example, print ticket 126 may specify a size for a sheet of print job 103 as well as weight, quality of paper, color of paper, punched holes, and the like. The operator may generate print ticket 126 when submitting print job 103 for printing within printing system 100. Information from print ticket 126, such as one or more parameters 128, may be used to generate a list of recommended papers to display for print job 103. Print ticket 126 also may include mapped variables and their values from data files, as disclosed in greater detail below.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 114, second paper tray 110 having paper 116, and so on to Nth paper tray 112 having paper 118. Current job 107 may use paper from one or more of these paper trays. In some embodiments, paper 114, paper 116, and paper 118 are different types of paper or different media. For example, current job 107 may use paper 116 from second paper tray 110 while print job 103 may require paper 114 from first paper tray 108.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 120 may be displayed on client device 102. The disclosed embodiments may use user interface 120 to select papers for print job 103.

DFE 106 also includes paper catalog 124. Paper catalog 124 is configured to organize and store existing calibration data and ICC profiles for a plurality of papers. Upon selection of a paper for printing at printing device, paper catalog 124 may be accessed to complete print job 103 according to the expectations associated with the print job. Paper catalog 124 is disclosed in greater detail below by FIG. 3. In some embodiments, DFE 106 may include multiple paper catalogs. Further, paper catalog 124 also may be stored in another component within printing system 100 and accessible by DFE 106.

Printing system 100 also may include a print management server 105. Print management server 105 may coordinate print jobs within printing system 100 as well as perform processing operations for print jobs at a central location. For example, print management server 105 may perform the operations of DFE 106, disclosed below. This feature allows the processing requirements to be offloaded from printing device 104 to reduce the amount of lag or memory requirements for large print jobs. Further, updates to processing software may occur at print management server 105 instead of each printing device 104. In some embodiments, client device 102 may forward print job 103 to print management server 105 instead of printing device 104. Print management server 105 may manage printing operations within printing system 100 so that print job 103 is sent to the best printing device to print the document.

Figure 1B:
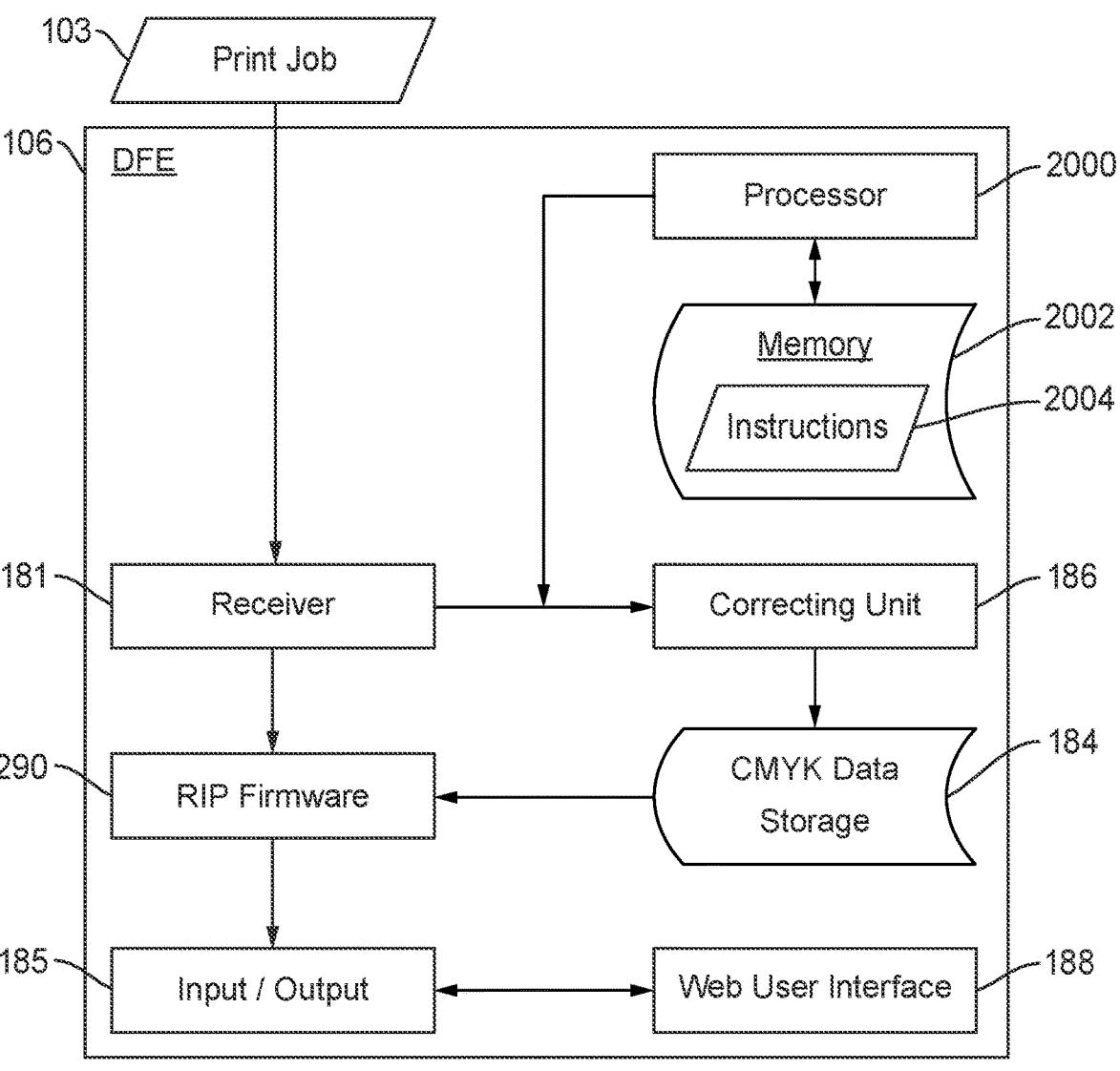
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed above and below.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

In some embodiments, DFE 106 includes a processor 2000 and memory 2002. Memory 2002 may store instructions 2004, which when executed, cause the processor to configure itself into a special purpose machine. In this instance, processor 2000 may be configured into a configurator within DFE 106. A configurator is disclosed in greater detail below. More than one processor 2000 may be within DFE 106 so that multiple configurators may be generated by instructions 2004. Processor 2000 also may communicate with the other components within DFE 106 and receive files and data from components outside DFE 106.

Figure 2:
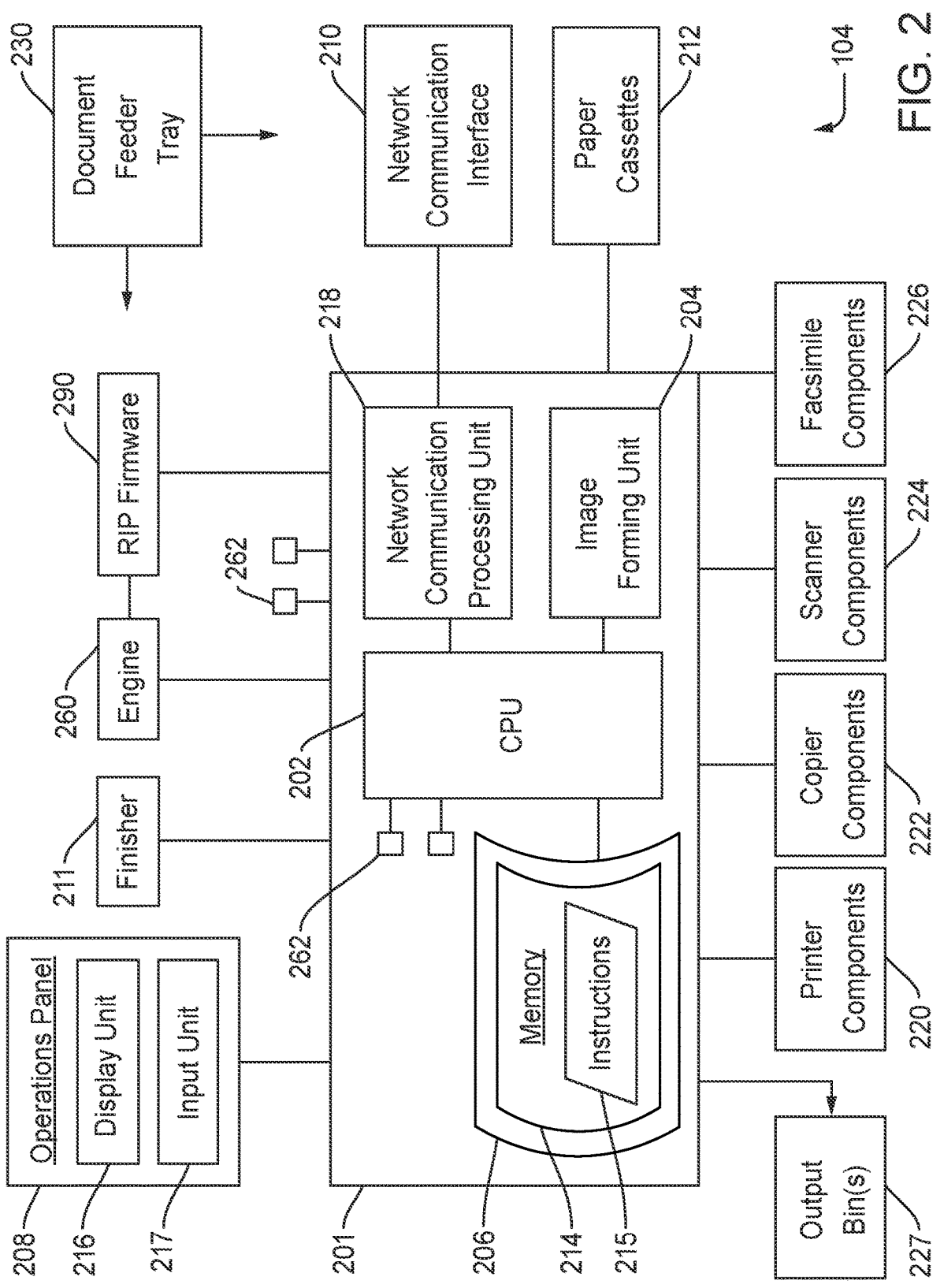
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multifunctional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108, 110, and 112 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
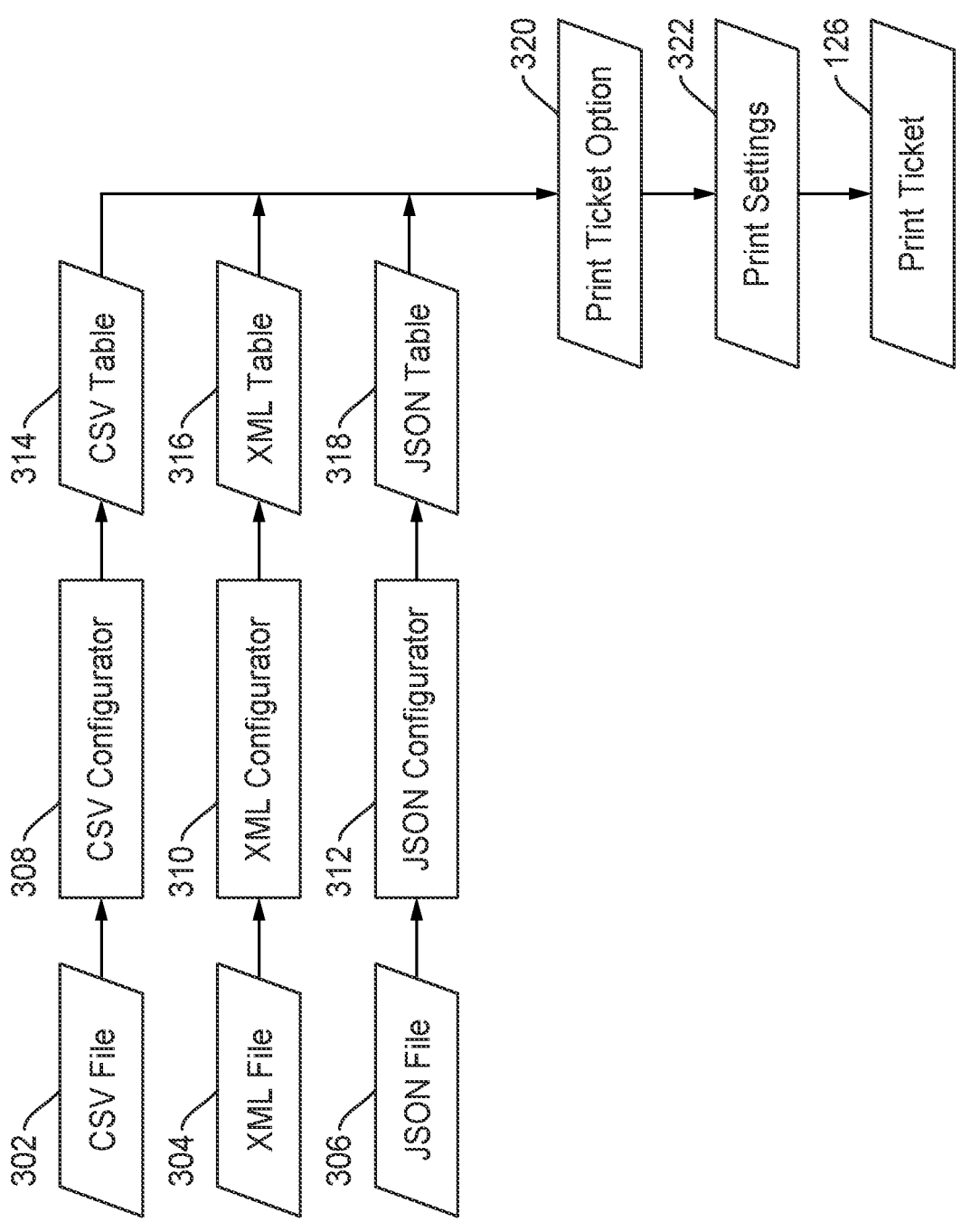
FIG. 3 illustrates a block diagram of configurators being used to generate print settings for a print ticket according to the disclosed embodiments.

FIG. 3 depicts a block diagram of configurators being used to generate print ticket 126 according to the disclosed embodiments. The disclosed embodiments extend the job submission process to DFE 106 to support any type of file. The disclosed embodiments also use configurators to allow format-specific configurations that control how files of a specific format are consumed and mapped into printing instructions within print ticket 126. The configurators may be associated with specific file types. The configurators read the files from printing system 100 and generates the instructions to print the data in the file. The features disclosed in FIG. 3 may be implemented at DFE 106, client device 102, or print management server 105.

For example, printing device 104 may receive print jobs having comma-separated value (CSV) files, Extensible Markup Language (XML), and JavaScript Object Notation (JSON) files. Additional file formats may be supported but are not discussed here for brevity. These file formats may allow the data within the files to be saved in a tabular format. Each line may represent one data record. Thus, the disclosed embodiments may receive CSV file 302, XML file 304, or JSON file 306 to use in printing operations. An example of a data file is disclosed in FIG. 4 below.

Each file type is routed to a configurator associated with the file format. CSV file 302 is routed to CSV configurator 308. XML file 304 is routed to XML configurator 310. JSON file 306 is routed to JSON configurator 312. The configurators may be enabled by processor 2000 and memory 2002 having instructions 2004, as disclosed above. Processor 2000 is configured to perform the operations disclosed below. Although processor 2000 and memory 2004 are disclosed as being in DFE 106 in that an operator may perform operations at printing device 104, the disclosed embodiments also may be enacted at client device 102 with a printing application that submits print jobs to printing device 104.

A configurator is configured to parse the respective data file in order to define variables that may be used as print settings, or print ticket option 320, within print ticket 126. CSV configurator 308 allows parsing options to be defined for finding variables within CSV file 302. CSV configurator 308 allows the disclosed embodiments to specify variables for each CSV column of CSV file 302.

XML configurator 310 allows mapping or parsing to be specified for finding variables within XML file 304. XML configurator 310 allows the disclosed embodiments to specify variables for specific XML element or attribute values. JSON configurator 312 allows mapping or parsing to be specified for finding variables within JSON file 306. These operations are disclosed in greater detail below.

The result of the mapping or parsing of the data files is a format-specific table that is used for print ticket instructions. The disclosed embodiments may import one or more sample data files into a respective configurator. The configurator parses the data according to the format. For example, CSV file 302 may include commas to separate values within the data. CSV configurator 308 would parse the data according to the commas within the data fields. A preview of CSV table 314 is generated to allow the operator to view how the data of further CSV files will be parsed. The operator may map the variables for the parsed data to a print ticket option 320. Print ticket option 320 is disclosed in greater detail below.

Thus, CSV configurator 308 parses the data within CSV file 302 to generate CSV table 314 having a plurality of variables for the types of data within the file. Further, each variable has a plurality of values for the type of data within CSV file 302. CSV table 314 will show the plurality of variables in a format to view the plurality of values. The disclosed embodiments may then map one or more variables as shown in CSV table 314 to a print ticket option 320. After going through the print ticketing operation, the values for the selected variables within CSV table 314 are set as print settings 322 to be used in print ticket 126 for print jobs using the specified CSV format. For example, the variable may be the column while the data in the CSV table is the value for that variable.

This process may be repeated for XML configurator 310. XML configurator 310 parses the data within XML file 304 to generate XML table 316 having a plurality of variables for the types of data within the file. Each variable has a plurality of values for the type of data within XML file 304. XML table 316 will show the plurality of variables in a format to view the plurality of values. The disclosed embodiments may then map one or more variables as shown in XML table 316 to print ticket option 320. After going through the print ticketing operation, the selected variables within XML table 316 are set as print settings 322 to be used in print ticket 126 for print jobs using the specified XML format.

This feature may include some additional considerations. The operator may have to import multiple XML files in order to have representative values. In addition, there may be two types of sources for XML files that may be mapped as a variable, and their locations may vary. The operator may have to see the XML structure then select either an element or an attribute as the source for the variable. For XML, the operator may have to tell XML configurator 310 how to find each variable, as opposed to the process implemented by CSV configurator 308.

This process also may be repeated for JSON configurator 312. Similar to XML, the operator may need to see the JSON structure, even though JSON is closer to CSV than XML. The operator may then choose the source for each variable, like XML. JSON configurator 312 parses the data within JSON file 306 to generate JSON table 318 having a plurality of variables for the types of data within the file. Each variable has a plurality of values for the type of data within JSON file 306. JSON table 318 will show the plurality of variables in a format to view the plurality of values. The disclosed embodiments may then map one or more variables as shown in JSON table 318 to print ticket option 320. After going through the print ticketing operation, the selected variables within JSON table 318 are set as print settings 322 to be used in print ticket 126 for print jobs using the specified JSON format.

As print jobs are received for printing device 104, the data within data files may be parsed and set according to print settings 322 according to the format. Print settings 322 may indicate which variables within the print jobs are to be used. The values within each print job for the type of data may change, but the variables selected for print settings 322 should stay the same. This feature allows for consistent treatment of data files provided in print jobs depending on the data format.

Figure 4:
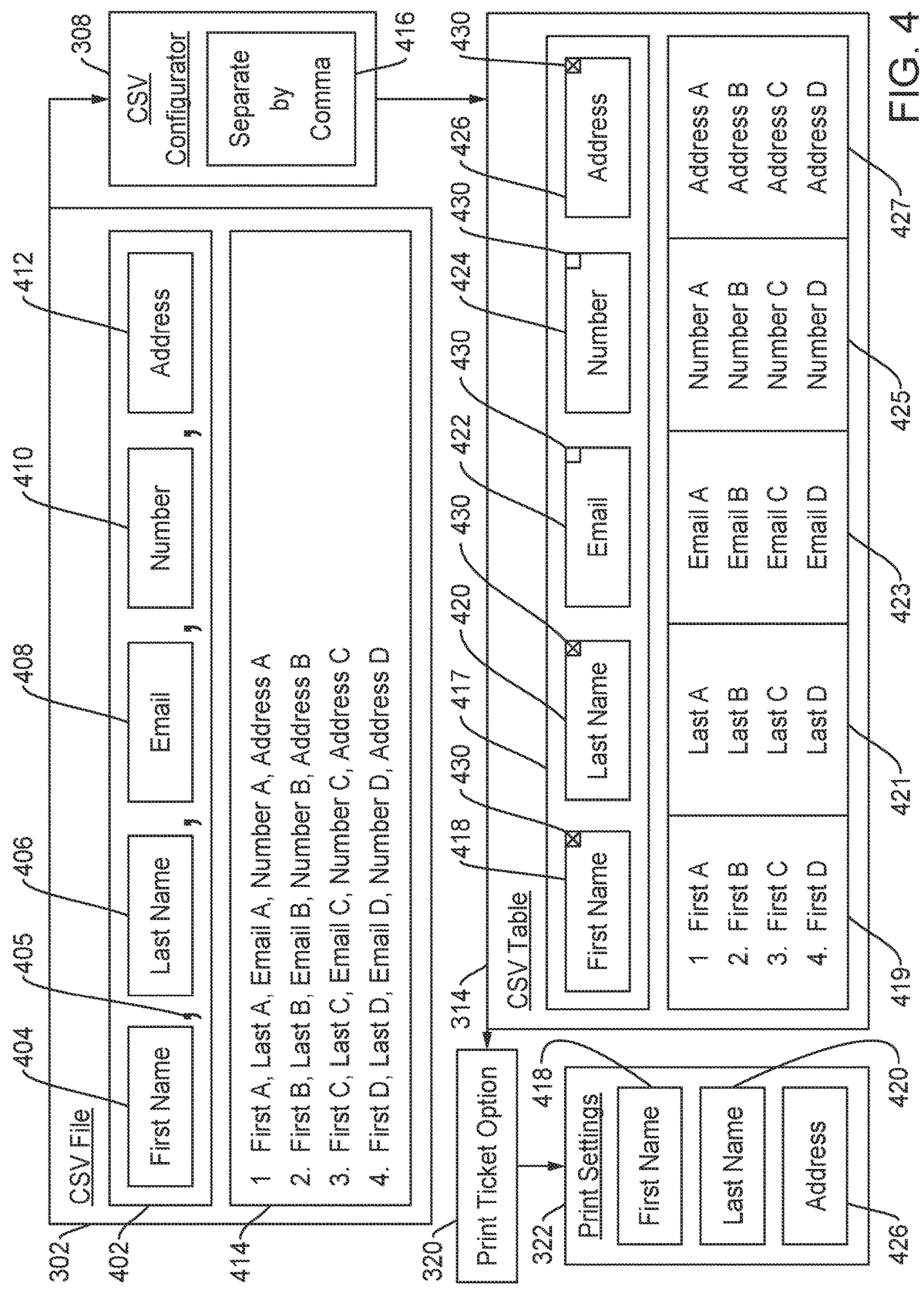
FIG. 4 illustrates a block diagram of parsing a data file and mapping variables from a generated table to a print ticket option according to the disclosed embodiments.

FIG. 4 depicts a block diagram of parsing a data file and mapping variables from a generated table to print ticket option 320 according to the disclosed embodiments. FIG. 4 shows a more detailed view of the operations disclosed in FIG. 3 with regard to generating a table of data corresponding to a data file having a specified format. The data table is generated by a configurator corresponding to the specified format. FIG. 4 discloses an example using CSV file 302, CSV configurator 308, and CSV table 314.

CSV file 302 may be received at CSV configurator 308 to generate CSV table 314. CSV file 302 may be sample CSV data to help the disclosed embodiments define print settings 322 to indicate those settings to be included in a print ticket 126 for a print job having the CSV format. Thus, CSV file 302 includes types of data 402 which indicates a name or description of the types of data found within the file. Values 414 are the data values for types of data 402 within the file. As may be appreciated, the data values are separated by commas. For example, type of data 402 includes first name values 404, last name values 406, email values 408, number values 410, and address values 412. Each type of data may be separated by a comma 405. Values 414 includes four (4) rows of data values, with a data value for each type of data.

First name values 404 may include firstA, firstB, firstC, and firstD. Last name values 406 may include lastA, lastB, lastC, and lastD. Email values 408 may include emailA, emailB, emailC, and emailD. Number values 410 may include numberA, numberB, numberC, and numberD. Address values 412 may include addressA, addressB, addressC, and addressD. Additional types of data and additional values for the types of data shown may be included in CSV file 302. In short, CSV file 302 may include large amounts of data having the same data types.

CSV file 302 is received by CSV configurator 308. The operator or an application may set a parameter 416 in CSV configurator 308 that indicates how to parse types of data 402 and values 414 within CSV file 302. For example, parameter 416 may be set to separate data values by comma 405. XML configurator 310 may include a parameter 416 to define mapping to find types of data 402 within XML file 304. JSON configurator 312 may include a parameter 416 to define mapping to find types of data 402 within JSON file 306.

Configurator 308 parses values 414 of CSV file 302. Configurator 308 generates CSV table 314 that includes a plurality of variables 417. Each variable corresponds to a type of data. For example, first name variable 418 is defined and corresponds to first name values 404. Last name variable 420 also is defined and corresponds to last name values 406. Email variable 422 is defined and corresponds to email values 408. Number variable 424 is defined and corresponds to number values 410. Address variable 426 is defined and corresponds to address values 412. The variables may be shown in columns within CSV table 314 that are separated from each other so that an operator may clearly see what variables 417 are defined from these print jobs.

For each of plurality of variables 417, the unique values for each variable as set forth by the corresponding type of data is retrieved from CSV file 302. Referring to CSV table 314, first name unique values 419 are retrieved for first name variable 418. The unique values for first name unique values 419 may be shown, which correspond to values 414 within CSV file 302. First name unique values 419 may list firstA, firstB, firstC, and firstD so that an operator may see the unique values paired with first name variable 418.

The unique values for the other variables also are retrieved. For last name variable 420, last name unique values 421 are retrieved, which correspond to values 414 within CSV file 302. Last name unique values 421 may list lastA, lastB, lastC, and lastD so that an operator may see the unique values paired with last name variable 420. For email variable 422, email unique values 423 are retrieved, which correspond to values 414 within CSV file 302. Email unique values 423 may list emailA, emailB, emailC, and emailD so that an operator may see the unique values paired with email variable 422.

For number variable 424, number unique values 425 are retrieved, which correspond to values 414 within CSV file 302. Number unique values 425 may list numberA, numberB, numberC, and numberD so that an operator may see the unique values paired with number variable 424. For address variable 426, address unique value 427 are retrieved, which correspond to values 414 within CSV file 302. Address unique value 427 may list addressA, addressB, addressC, and addressD so that an operator may see the unique values paired with address variable 426.

Thus, the data provided in CSV file 302 is transformed into CSV table 314 with variables 417 identified along with the unique values for the variables to provide a representation of the variables to be mapped to a print ticket option 320 for generating print settings 322. Once the configuration is completed by CSV configurator 308, the disclosed embodiments will have a list of variables 417 whose values 419-427 are populated for each data file based on the configuration.

Variable 417 are mapped along with their values to specific a print ticket option 320. Selection boxes 430 may be marked for those variables 417 to be mapped. Not every variable will be mapped to print ticket option 320. For example, referring to CSV table 314, first name variable 418 is marked by its selection box 430 to map to print ticket option 320. Last name variable 420 is marked by its selection box 430 to map to print ticket option 320. Address variable 426 is marked by its selection box 430 to map to print ticket option 320. In contrast, email variable 422 and number variable 424 do not have their selection boxes 430 marked so they will not be mapped to print ticket option 320.

Specific print ticket options may refer to closed print ticketing, open print ticketing, and hybrid print ticketing. The selected print ticket option will allow the disclosed embodiments to specify how the selected variables 417 and associated unique values of data will be handled during printing operations. An operator may define features for the variables and associated values.

Closed print ticketing is a print ticketing option that has a defined set of values. The disclosed embodiments will have the option to specify which variable 417 is used to define the values. For example, number variable 424 is used to define number unique values 419 using a defined set of phone numbers. In other words, number unique values 419 will have one of the defined numbers, such as office phone numbers for a company. Using another example, in some embodiments, the defined set of values are set for the variable related to sides. For example, sides for printing a document may be front, back, head to head, or head to toe. Thus, unique values for this variable may be those choices.

The disclosed embodiments may define a different variable for each data format. In other words, a variable 417 may be defined for CSV file 301 and a different variable 417 for JSON file 306. The disclosed embodiments also may specify one or more variable values that will map to each of the possible print ticket options. For example, the disclosed embodiments may map OneSided and Simplex values to front for the sides variable. The mapping also may be done differently for each type of data file-CSV, XML, and JSON.

Open print ticketing is a print ticketing option that does not have a defined set of values, but may have a valid range of values. For open print ticketing, the disclosed embodiments may have the option to specify which variable 417 is used to define the unique value. The variable value, or unique value, is valid for the print ticketing option. The disclosed embodiments may define a different variable for each data format, such as a variable 417 may be defined for CSV file 301 and a different variable 417 for JSON file 306.

Hybrid print ticketing is a print ticketing option that does not have a defined set of values but for which the disclosed embodiments will allow the embodiments to define a value using a combination of static text and one or more variables 417. For example, a file location variable may include a static URL text along with a unique value for the variable.

After mapping to print ticket option 320 and defining any values needed for a selected variable 417, the mapping and variables may be placed into print settings 322 for print ticket 126. As shown, selected variables of first name variable 418, last name variable 420, and address 426 may be placed into print settings 322. Thus, a print ticket 126 would include a print setting for these variables such that print jobs having CSV files 302 would print documents including the values for these variables in the number of specified copies.

After configuration is complete, the disclosed embodiments are ready to accept print job submissions using the configured data types. When a file is received, regardless of submission, the disclosed embodiments will identify the file and determine whether it is a file type that should be parsed per the data source configuration. For example, a file is received and determined whether it is CSV file 302, XML file 304, or JSON file 306. The determined configurator will parse the file. The configurator also will set the variables and then use those variables to create print ticket 126 for the print job. The print job is then submitted with the created print ticket 126.

Using the above examples, copies would be printed with a first document having firstA, lastA, and addressA, a second document having firstB, lastB, and addressB, a third document having firstC, lastC, and addressC, and a fourth document having firstD, lastD, and addressD. In some embodiments, all variables 417 are mapped to print ticket option 320 and, in turn, used to generate the documents using the unique values for each variable.

FIG. 5 depicts a flowchart 500 for using a configurator to map variables for a data file to a print ticket 126 according to the disclosed embodiments. Flowchart 500 may refer to FIGS. 1A-4 for illustrative purposes. Flowchart 500, however, is not limited to the embodiments disclosed by FIGS. 1A-4.

Step 502 executes by importing a data file having values 414, such as CSV file 302, XML file 304, or JSON file 306. Step 504 executes by determining a format of the data file, such as either CSV, XML, or JSON. Other formats may be imported. Each format may have its data separated uniquely. Step 506 executes by assigning the data file to a configurator based on the format. For example, CSV file 302 is assigned to CSV configurator 308, XML file 304 is assigned to XML configurator 310, and JSON file 306 is assigned to JSON configurator 312.

Step 508 executes by the assigned configurator parsing the data file to identify the types of data within the file. For example, CSV configurator 308 parses CSV file 302 using parameter 416 of separating the data with values 414 using comma 405. Step 510 may optionally execute by generating a table according to the format of the data file having variables within the data file and the unique values for the variables. For example, CSV configurator 308 may generate CSV table 314 having variables 417 identified as having unique values. CSV table 314 may display these variables 417. Step 512 executes by populating CSV table 314 with the unique values for the variables. For example, first name variable 418 may include fields populated with first name unique values 419 as taken from values 414 in CSV file 302. The fields for the other variables also may be populated.

Step 514 executes by selecting one or more variables from the table. In some embodiments, all variables may be selected. For example, first name variable 418, last name variable 420, and address variable 426 may be elected from CSV table 314. Step 518 executes by mapping the selected variable or variables to a print ticket option 320. As disclosed above, different print ticketing options may be selected. Using the selected print ticket option, values for the selected variables are defined. Step 518 executes by creating print settings applicable for a print ticket 126 for the data file format. For example, when a print job having a CSV file is received, print ticket 126 will include print settings including the selected variables along with any defined values from print ticket option 320.

Step 520 executes by receiving print job 103 within printing system 100. Print job 103 may be received by printing device 104 or print management server 105. Further, it may be generated at client device 102. Step 522 executes by determining a data file format for print job 103. As disclosed above, it may be CSV, XML, or JSON. Step 524 executes by creating print ticket 126 for print job 103 using the configuration generated for the file format. For example, data files having the CSV file format may generate print ticket 126 using the selected variables along with defined values, if applicable. Step 526 executes by printing n copies of the document of print job 103 using the unique values of the variables according to print ticket 126.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing printing operations, the method comprising:

importing a configuration data file into a configurator, wherein the configuration data file includes a plurality of types of data;

parsing the configuration data file to define a plurality of variables using the configurator, wherein each variable corresponds to a type of data from the plurality of types of data and wherein the type of data has a plurality of values;

generating a table having entries for each variable, wherein the entries for each variable are populated by one of the plurality of values for the type of data corresponding to the variable;

selecting a variable from the table, wherein the variable is within the configuration data file;

mapping the variable to a print ticket option; and creating a print ticket for a print job, wherein the print ticket includes the print ticket option having the variable associated with a print file for the print job.

2. The method of claim 1, wherein the configuration data file is a format specific file type with the plurality of types of data having a specific format.

3. The method of claim 1, wherein the configuration data file is a comma-separated value (CSV) file.

4. The method of claim 1, wherein the configuration data file is an Extensible Markup Language (XML) file.

5. The method of claim 1, wherein the configuration data file is a JavaScript Object Notation (JSON) file.

6. The method of claim 1, wherein the print ticket option is a closed print ticket option having a defined set of values.

7. The method of claim 6, wherein mapping the variable to the print ticket option includes mapping the variable values from the configuration data file to the defined set of values.

8. The method of claim 1, wherein the print ticket option is an open print ticket option that does not have a defined set of values.

9. The method of claim 1, wherein the print ticket option is a blended ticket option that includes values defined using a combination of static text and the variable values.

10. The method of claim 1, wherein the print file generates n copies of the print job.

11. A method for managing printing operations, the method comprising:

generating a table having a plurality of variables derived from a configuration data file, wherein each of the plurality of variables includes a plurality of entries having a value of a plurality of values;

selecting a variable from the table, wherein the variable is within the configuration data file;

mapping the variable to a print ticket option;

creating a print ticket for a print job, wherein the print ticket includes the print ticket option having the variable associated with a print file for the print job, wherein the print file matches a file type of the configuration data file; and printing a document for the print job using the print ticket, wherein a value is printed for the variable within the document according to the print ticket option.

12. The method of claim 11, further comprising importing the configuration data file into a configurator, wherein the configuration data file includes a plurality of types of data.

13. The method of claim 12, further comprising parsing the configuration data file to define the plurality of variables using the configurator.

14. The method of claim 11, wherein the configuration data file a comma-separated value (CSV) file, an Extensible Markup Language (XML) file, or a JavaScript Object Notation (JSON) file.

15. The method of claim 11, wherein the print ticket option is a closed print ticket option having a defined set of values.

16. The method of claim 11, wherein the print ticket option is an open print ticket option that does not have a defined set of values.

17. The method of claim 11, wherein the print ticket option is a blended ticket option that includes values defined using a combination of static text and the variable values.

18. A printing system comprising:

a processor; and a memory connected to the processor, wherein the memory stores instructions that, when executed using the processor, configures the printing system to import a configuration data file into a configurator, wherein the configuration data file includes a plurality of types of data;

parse the configuration data file to define a plurality of variables using the configurator, wherein each variable corresponds to a type of data from the plurality of types of data and wherein the type of data has a plurality of values;

generate a table having entries for each variable, wherein the entries for each variable are populated by one of the plurality of values for the type of data corresponding to the variable;

select a variable from the table, wherein the variable is within the configuration data file;

map the variable to a print ticket option; and create a print ticket for a print job, wherein the print ticket includes the print ticket option having the variable associated with a print file for the print job.

19. The printing system of claim 18, wherein the processor and the memory are located within a printing device.

20. The printing system of claim 18, wherein the processor and the memory are located in a print management server.

* * * * *